INVENTORS
MARCUS J. AUERNHAMMER
WILLIAM A. WAARA.
BY Hauke, Krass, & Gifford
ATTORNEYS

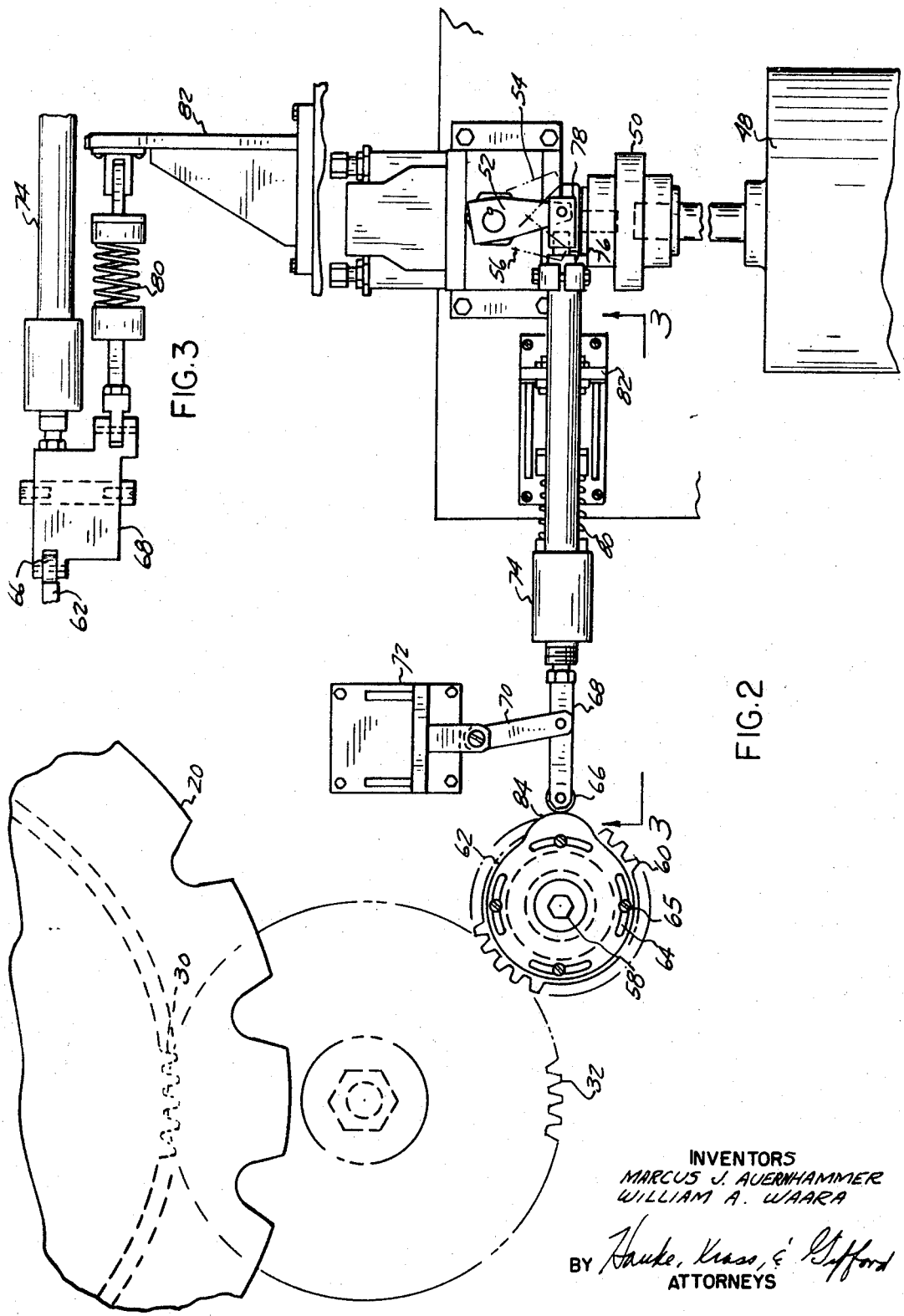

April 8, 1969    M. J. AUERNHAMMER ET AL    3,437,191
INDEXING DRIVE FOR TRANSFER MACHINE
Filed Sept. 12, 1966    Sheet 3 of 3
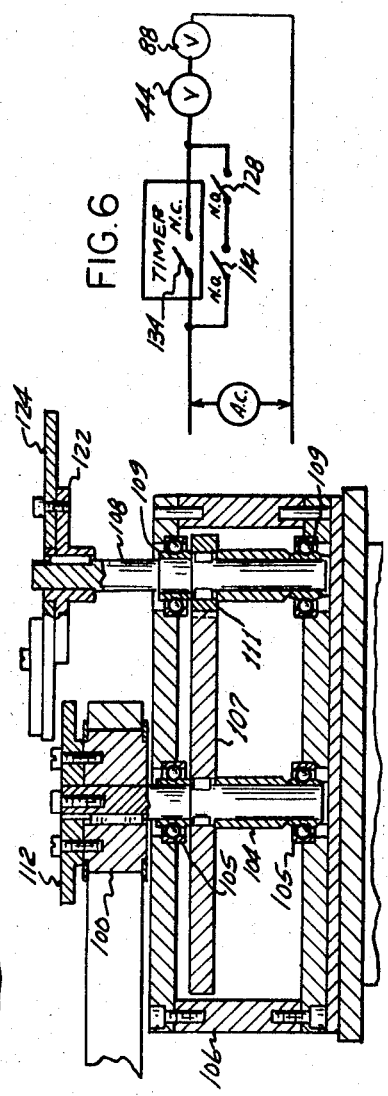
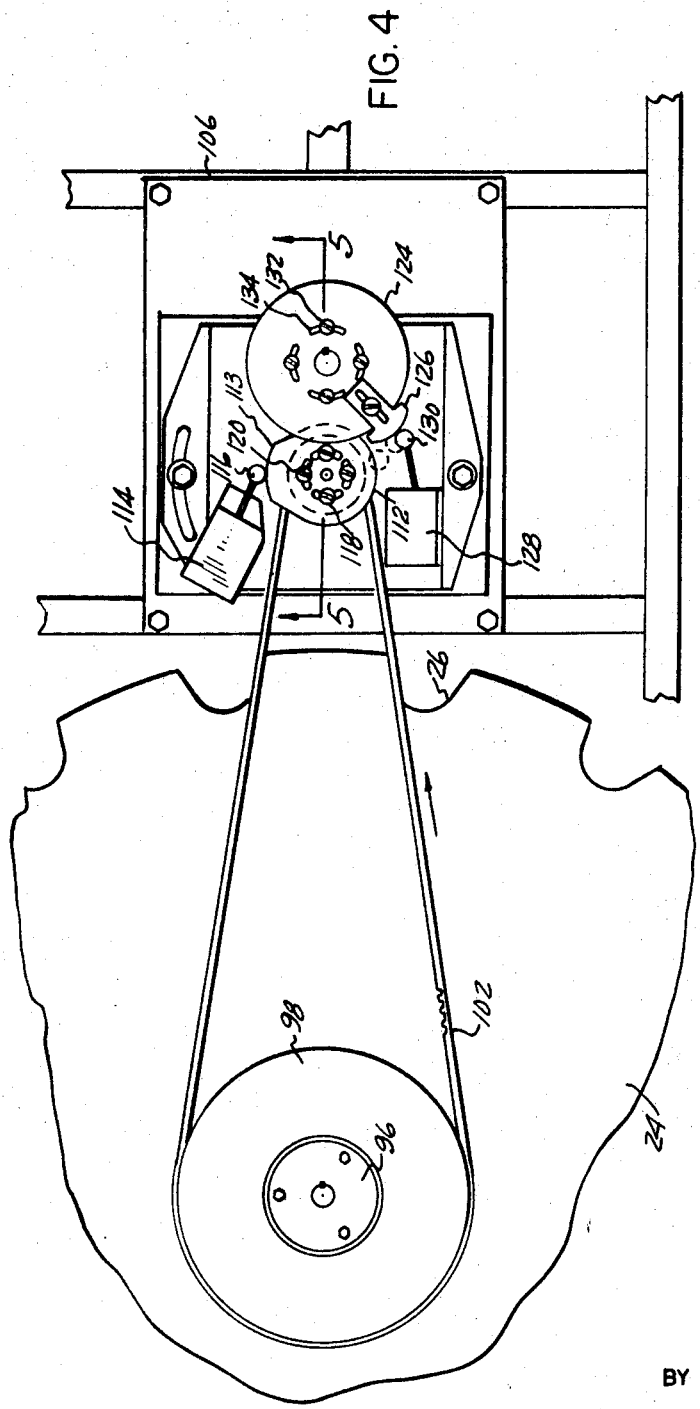
INVENTORS
MARCUS J. AUERNHAMMER
WILLIAM A. WAARA
BY Hauk, Krass, & Gifford
ATTORNEYS

United States Patent Office 3,437,191
Patented Apr. 8, 1969

3,437,191
INDEXING DRIVE FOR TRANSFER MACHINE
Marcus J. Auernhammer and William A. Waara, Detroit, Mich., assignors to Visi-Trol Engineering Company, Detroit, Mich., a corporation of Michigan
Filed Sept. 12, 1966, Ser. No. 578,715
Int. Cl. B65g 15/00, 23/06
U.S. Cl. 198—135   8 Claims

ABSTRACT OF THE DISCLOSURE

A hydraulic motor connected to a variable volume pump provides intermittent driving motion to a transfer apparatus. The output of the motor is proportional to the pump output which is controlled by a movably mounted cylinder having an extensible rod actuated by a dual cam vernier timing means. The cylinder couples the motor output to the pump control member with the movement of the cylinder and rod providing a rough control and the extension of the rod providing a fine control.

---

This invention relates to drive systems and more particularly to a hydraulic drive system for driving a work piece transfer means at a predetermined variable rate between successive work stations and which includes means for instantaneously stopping the drive system when a workpiece is precisely aligned with respect to each work station.

Modern automated high speed assembly operations normally include a form of transfer apparatus for transporting a continuous series of workpieces into a working position with a succession of work stations wherein a sequence of finishing operations are performed thereon. The modern transfer line normally includes some sort of continuous track on which the workpieces are advanced from one work station to a succeeding work station and then the advancing motion terminated for a timed interval when the workpiece is positionally aligned with respect to the work station to permit the finishing operation to be performed thereon. When the particular operation has been completed, the workpiece is advanced to a new work station. This indexing movement of the workpiece is repeated for the necessary sequence of finishing operations.

The problem associated with the conventional workpiece transfer apparatus lies in the means to obtain a precise indexing of the workpieces through successive work stations. This indexing problem, in essence a drive control problem, involves a twofold objective. First, it is desirable in order to achieve a high production rate that the workpieces be advanced between finishing operations at as rapid a rate as possible. Secondly, the workpieces at the end of their transfer movement from the previous work station must be precisely aligned with the new work station. Conventional drive systems have had to reach a compromise between a high advance rate and the precise positioning of the workpiece. This is because conventional drive systems have a tendency to coast, due to the inertia of the drive members, at the end of their advance, thus reducing the stopping accuracy of the transfer apparatus. This results in a sacrifice in positional accuracy.

The present invention obviates the problems encountered in the prior art in achieving a controllable transfer rate between work stations and in precisely stopping the transfer apparatus when the workpiece has registered in each succeeding work station. The preferred embodiment of the present invention, which will be subsequently described in detail, includes a variable rate drive system including means for accelerating the transfer of the workpiece as it leaves a first station and then decelerating the workpiece as it approaches a new work station, and a vernier adjustable signaling system for precisely stopping the drive system when the workpiece has moved a distance sufficient from the first work station to the second work station to be precisely aligned with the latter.

The drive system includes a hydraulic motor drivingly coupled to a drive shaft which is adapted for connection to a workpiece transfer apparatus. The motor is operatively connected to the output of a variable volume hydraulic pump. The drive motor has a rotating output proportional to the output of the variable volume pump. The pump is preferably controlled by a lever selectively movable between a first extreme position wherein the fluid output of the pump is terminated and a second opposite extreme position wherein the fluid output of the pump is at a maximum. A camshaft is connected for rotation in timed relationship with the drive shaft. The camshaft carries a cam member having a contour corresponding to a predetermined acceleration-deceleration rate of the transfer line. The hydraulic pump control lever moves in response to the changing contour of the cam through a follower linkage.

The follower linkage includes a spring loaded follower member which is biased against the cam surface. The follower member is connected at its opposite end with an air cylinder having an extensible rod connected to the fluid pump lever. Normally the follower member and fluid cylinder move in combination in response to the changing contour of the cam for a predetermined revolution of the drive shaft. The vernier signaling system is then operative to actuate the air cylinder to extend the rod a distance sufficient to drive the control lever into its first extreme position, thereby terminating the output of the fluid pump to the fluid motor so that the transfer line stops. The transfer the remains in a stopped position for a time determined by a timing device before the air cylinder retracts the rod a distance sufficient to permit the fluid pump to commence delivering fluid to the fluid motor thereby starting a new cycle.

The vernier signaling system includes a first cam member carried by a cam shaft which rotates at a timed relationship with the movement of the transfer line. The first cam member engages a conventional limit switch once every revolution of the camshaft. A second cam having a radially adjustable lobe is carried by a second cam shaft which rotates in timed relationship with the first camshaft through a pair of meshed gears. The second cam is associated with a second limit switch. The second camshaft is geared to rotate at a higher rate than the first camshaft.

In the preferred embodiment, the second cam shaft is geared to rotate at a rate five times faster than the first camshaft. By adjusting the lobe of the second cam, the two cams can be adapted to engage a respective limit switch simultaneously every fifth revolution of the first cam. The two limit switches are connected in series with a solenoid valve controlling a source of pressurized fluid to actuate the air cylinder. The first cam permits a rough timing adjustment and the second cam a fine timing adjustment in cooperation with the first cam. It can be seen that a very precise vernier timing adjustment can be established terminating the output of the hydraulic drive system to stop the workpiece transfer apparatus after a precisely defined and regular movement corresponding to the distance between work stations.

It can therefore be seen that the primary advantage of the present invention is that the rotation of the drive system can be very precisely controlled, thereby controlling the transfer movement of a plurality of work pieces which are to pass into registration with a succession of work stations each of which progressively finishes the work pieces. This improved indexing control permits a much tighter dimensional control of the finishing tolerances achieved by the work stations.

A present advantage of the second invention is that the movement of advance of the work pieces from station to station can be very precisely controlled by properly defining the cam contour to thereby achieve an optimum transfer rate.

It is therefore a primary object of the present invention to provide in a work piece transfer apparatus a hydraulic drive system having a rotary output proportional to the output of a variable volume pump which is under the control of a cam having a profile corresponding to the desired acceleration and deceleration of the transfer apparatus between successive work stations.

It is another object of the present invention to improve the means for precisely indexing work pieces in an automatic work transfer apparatus by providing a drive system for such a transfer apparatus having a vernier adjusting means for precisely terminating the movement of the drive system as the work piece approaches the work station and which comprises a pair of cam members rotating in timed relationship with the movement of the transfer system and including a first cam providing a rough timing adjustment and a second cam providing in cooperation with the first cam a fine timing adjustment, the two cams combining to transmit a signal to means effective to render ineffective the power unit of the drive system.

Other objects and advantages will be more readily apparent from the following detailed description of a preferred embodiment of the present invention. The description makes reference to the accompanying drawings in which like reference characters refer to like parts throughout the several views and in which:

FIG. 2 is an enlarged plan view illustrating in detail the drive system shown in FIG. 1, and with parts removed for purposes of clarity;

FIG. 3 is a view taken along lines 3—3 of FIG. 2;

FIG. 4 is an enlarged view of the vernier adjustable signaling system illustrated in FIG. 1;

FIG. 5 is a sectional view taken along lines 5—5 of FIG. 4, and

FIG. 6 is a schematic view in part of the electrical system employed with the structure of FIG. 1.

Figure 1:
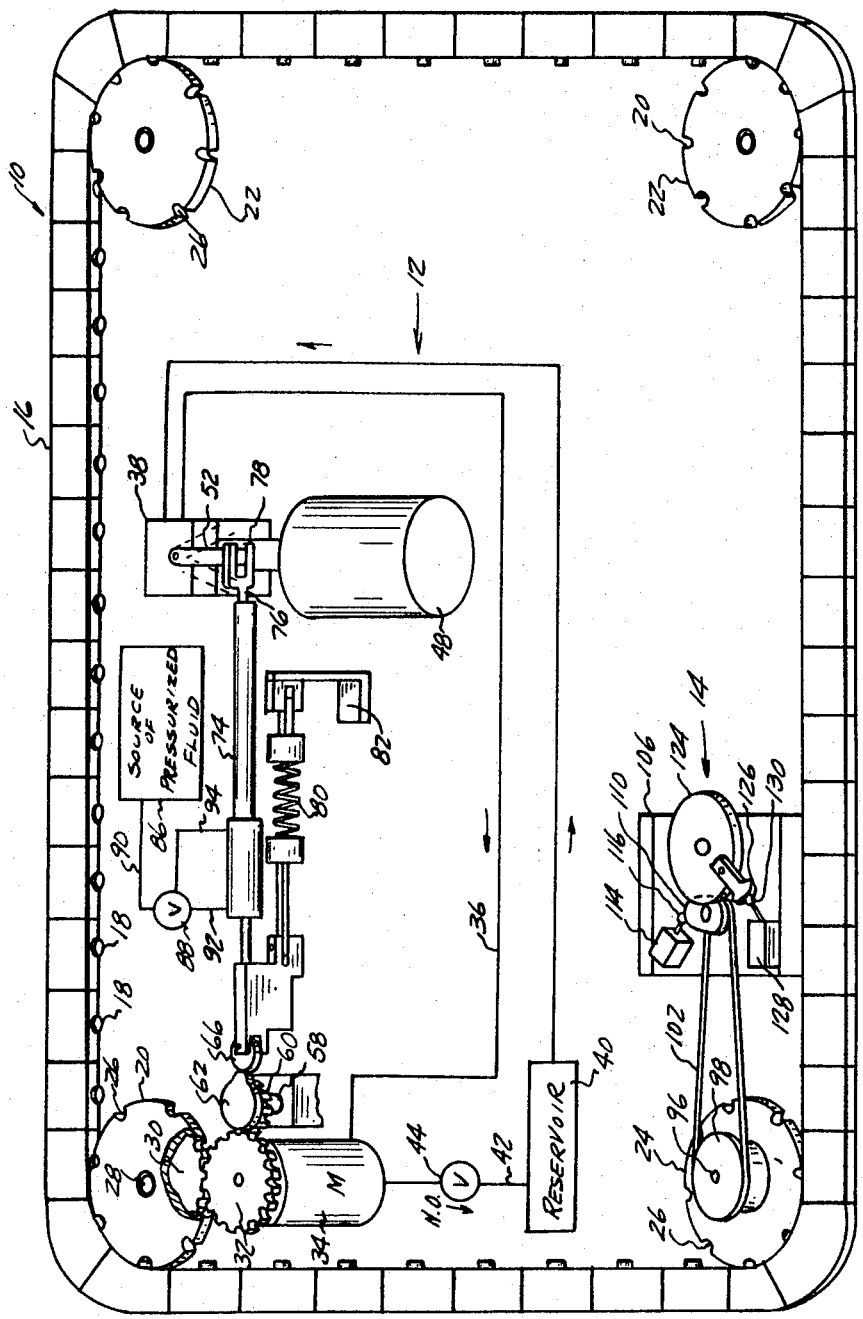
FIG. 1 is a diagrammatic plan view of a work piece transfer system embodying the drive apparatus of the present invention.

The preferred embodiment of the invention is illustrated in FIG. 1 as employed with a conveyor system generally indicated at 10 and which is driven by a drive system generally indicated at 12 which is in turn controlled by a vernier indexing system 14.

The present invention may be associated with any conventional conveyor system, but for purposes of description the conveyor system 10 comprises a plurality of work holding platens 16 arranged in a continuous series and slidably mounted on a generally rectangular track (not shown). It is to be understood that the work holding platens 16 are each adapted to carry a work piece (not shown) which is carried past one or more work stations (not shown). Normally the work stations will perform a finishing operation on the work piece while the work holding platens 16 are held stationary. When the particular finishing operation has been performed, the conveyor system 10 is then indexed to transfer the platens to a new work station.

Each of the platens carries on its inwardly directed side, a dog 18 which is drivably engaged by a drive sprocket 20 associated with a drive system 12.

The drive sprocket 20 is drivingly associated with one corner of the conveyor system 10, a pair of idler sprocket wheels 22 are associated with two of the other corners of the conveyor system 10 and a third idler sprocket 24 is associated with the fourth corner of the conveyor system and as illustrated in FIG. 1 is drivingly connected to the vernier indexing system 14. Preferably each of the sprockets 20, 22 and 24 have a common pitch diameter and are provided with a similar number of circumferentially spaced peripheral notches 26 which engage the dogs 18 either in a driving or a driven relationship depending on the function of the particular sprocket wheel. Thus it will be seen that all of the sprocket wheels normally have a common rotational rate.

The drive sprocket wheel 20 is carried for rotation on a shaft 28 which also carries, axially spaced from the drive sprocket 20, a gear 30 which meshes with a gear 32 carried on the output shaft of a hydraulic motor 34. The hydraulic motor 34 is fluidly connected through a fluid supply conduit 36 to a variable volume pump 38. It is to be understood that the rotational output of the hydraulic motor 34 is proportional to the input supplied by the pump 38, so that when the pump 38 has no output, the motor 34 is in a stationary condition and when the pump 38 has a maximum volume or fluid output, the motor 34 is thereby driven at its maximum rotational output.

The hydraulic motor 34 has a fluid discharge to a reservoir 40 through a discharge conduit 42. A normally open solenoid valve 44 is disposed in the conduit 42 and permits fluid discharge from the motor 34 to the reservoir 40. It is to be understood that when the valve 44 is in its closed condition, it not only prevents fluid communication between the motor and the reservoir, but because fluid is prevented from discharging from the motor 34, the motor is thereby unable to rotate.

The reservoir 40 functions as a source of fluid supply through a conduit 46 to the variable volume pump 38.

Referring to FIG. 2, the pump 38 has a conventional configuration and is driven by a continuously rotating electric motor 48 through a coupling 50. The pump 38 is of the type having a variable output controlled by a pivotally mounted lever 52 which, as can best be seen in FIG. 2, is selectively movable in a stroke between a first extreme position illustrated in phantom at 54 wherein the pump has no fluid output and a second extreme position illustrated in phantom at 56 wherein the pump has a maximum output. Thus it can be seen that by controlling the disposition of the lever 52, that the rotational output of the hydraulic motor 34 is thereby controlled which in turn controls the linear motion of the conveyor system 10.

Referring to FIGS. 1 and 2, a cam shaft 58 supported for rotation carries a gear 60 which is in mesh with the output gear 32 of the hydraulic motor 34 so that the cam shaft rotates in timed relationship with the drive sprocket 20. A cam member 62 is disposed on the outer end of the camshaft 58 and is provided with a plurality of arcuate slots 64. A threaded fastener 65 fixes the cam member 62 to the gear 60. It can be seen that the slots 64 permit the relative disposition of the cam 62 and the gear 60 to be adjusted.

A follower member 66 carried by a link 68 rides on the profiled circumference of the cam member 62 and is supported by a link 70 which is pivotally attached to a bracket 72 and which permits the cam follower 66 to move in response to the changing contour of the cam.

Now as can be seen in FIGS. 2 and 3, the link 68 is fixed to a fluid actuated cylinder 74 which carries a projectable rod 76. The rod 76 is attached by a clevis member 78 to the free end of the control lever 52.

The link 68 and the cylinder 74 provides a rigid linkage between the follower 66 and the lever 52 so that the lever 52 moves in response to the changing contour of the cam 62.

A spring member 80 having one end attached to a stationary bracket 82 and its opposite end pivotally connected to the link 68 normally biases the follower 66 against the cam 62 so that the follower is at all times in contact with the contoured surface of the cam 62.

Now referring back to FIG. 2 the cam 62 is provided with a lobe 84. It can be seen that as the follower 66 rides up over the lobe 84, the lever 52 swings toward its extreme right position 54. When the follower 66 is on the extreme peak of the lobe 84, the combined length of the link 68 and the cylinder 74 is adjusted so that lever 52 is just short of its extreme position so that the pump 38 has a relatively low output. Thus the rotation of the cam alone will not shut off the output of the pump 38. The cylinder rod 76 is provided with a stroke sufficient to drive the lever 52 home into its extreme position 54 when the follower is on the apex of the lobe 84.

A source of pressurized fluid 86 which preferably takes the form of compressed air is fluidly connected to a four-way solenoid valve 88 through a conduit 90. The valve 88 is connected to the fluid cylinder through a flexible conduit 94. The valve 88 is shiftable between alternate positions wherein it delivers pressurized fluid to the cylinder through conduit 92 so that the cylinder rod 76 is projected into its extended position or through conduit 94 in a manner operative to retract the cylinder rod 76. The solenoid four-way valve 88 is under the control of the vernier indexing system in a manner which will be subsequently described in detail.

Now referring to FIGS. 4 and 5 for a detailed description of the vernier indexing system 14, the idler sprocket wheel 26 is supported for rotation to a shaft 96 which in turn carries on its outer end a sheave 98 drivingly connected to a smaller sheave 100 through a timing belt 102. The sheave 100 is carried by a shaft 104 which is journaled for rotation by spaced apart bearings 105 mounted in a gear reduction housing 106. The housing 106 also carries a second shaft 108 which is journalled for rotation in bearings 109. The shaft 108 is driven by the shaft 104 through a pair of meshing gears 107 and 111 which are preferably adapted so that the shaft 108 rotates at higher rate than the shaft 104. Thus in the preferred embodiment the shaft 108 rotates at five times the rate of the shaft 104. A cam 110 is carried at the upper end of the shaft 104 and has a contour defining a lobe section 112. A normally open micro-switch 114 is mounted on the upper surface of the gear housing 106 and has an actuating arm 116 which engages the lobe 112 of the cam 110 as the cam 110 rotates so that the switch 114 is intermittently actuated.

The cam 110 is fixed to the sheave 108 through a plurality of threaded fasteners 118 each of which is disposed in an arcuate slot 120 which permits the cam 110 to be adjusted relative to the sheave 100.

The shaft 108 carries a wheel member 122 at its upper end. A circular plate member 124 is fixed to the wheel member and carries a radially adjustable finger member 126 which has an outer end which clears the periphery of plate 124. A second normally open micro-switch 128 is mounted on the upper surface of the gear housing 106 and has an actuating arm 130 disposed to engage the finger 126 at the end of each revolution of the shaft 108. The plate 124 is secured to the wheel 122 by a plurality of threaded fasteners which are engaged in arcuate slots 134 adapted to permit the circular plate 124 to be rotationally adjusted with respect to the wheel 122.

Now referring to FIG. 6 a preferred electrical circuit comprises the switches 114 and 128 connected in series with the solenoid actuated valves 44 and 88. Thus simultaneous actuation of limit switches 114 and 128 closes the valves 44 and 88.

The exact point at which the valves 44 and 88 will be actuated is established by adjusting the cam 110 so that the lobe section 112 energizes the micro-switch 114 at a position approximately corresponding to a predetermined rotation of the shaft 96 and then adjusting the finger 126 to precisely define the instant at which it will actuate the switch 128 thereby providing a vernier type adjustment in which the two micro-switches cooperate to transmit an actuating signal to the solenoid valves 44 and 88.

Now referring back to FIG. 6, when the valves 44 and 88 have been actuated into their closed condition, the conveyor system will be in a stopped condition for a predetermined time which is normally a time sufficient for a finishing operation to be performed on the work piece. A timer is disposed in the electrical circuit and has a normally closed switch 134 which is energized into an open position when the switches 114 and 128 are opened. The timer is adapted so that at the end of the predetermined period, the switch 134 closes thereby actuating the valves 44 and 88 into their normally open position. When the valve 88 is actuated it supplies a source of pressurized fluid to the opposite end of the cylinder 74 thereby producing a retraction of the rod 76 so that the control lever 52 is moved a relatively small distance from its extreme home position. Movement of lever 52 permits a sufficient amount of fluid to be delivered to the hydraulic motor 34 so that the motor begins to rotate thereby starting the cycle over again.

Now it can be seen that the lever 52 is movable in response to the contour of the cam 62. Furthermore the movement of the conveyor system corresponds to the position of lever 52 therefore the movement of the conveyor system corresponds to the shape of the cam 62. Normally the lobe 84 of the cam 62 is shaped so that the leading edge defines the manner in which the conveyor system will accelerate as the work piece leaves a work station and the trailing edge defines the manner in which the conveyor system will decelerate as it approaches a new work station. It can therefore be seen that a very precise control of the movement of the conveyor system 10 can be established by a proper definition of the contour of the cam 62.

It can be further seen that the termination of each transfer movement of the conveyor system 10 can be very finely and precisely controlled by a proper adjustment of the vernier indexing system 14.

Now having described the invention in its simplest terms, it is to be understood that the features of the construction may be changed and varied in greater or lesser degree without departing from the spirit of the invention or the scope of the appended claims.

Having described our invention, we claim:

1. A drive system for indexing a workpiece transfer means, comprising:
   (a) a drive shaft supported for rotation and adapted for a driving connection to a workpiece transfer means;
   (b) a hydraulic drive means coupled to said drive shaft and operable to rotate said drive shaft comprising:
      (1) a hydraulic motor having output coupled to said drive shaft;
      (2) a variable volume hydraulic pump having output to said hydraulic motor;
      (3) a control member connected to said variable volume pump and movable in a stroke between a first position and a second position; and
      (4) the output of said pump corresponding to the position of said control member and being variable between a first condition associated with the position of said control member wherein said pump delivers no output and a second condition associated with the second position of said control member wherein said pump has a maximum output;
   (c) means providing a connection between said control member and the output of said hydraulic motor comprising:
      (1) a cam member connected for rotation in timed relationship with said drive shaft, said cam having a contour;
      (2) a follower member operably engaged with the contour of said cam;
      (3) a cylinder member fixed to said follower member and movable therewith;
      (4) a rod member carried by said cylinder and projectable therefrom in response to a signal; and (5) a connection between said rod and said control member so that the output of said hydraulic motor corresponds to the contour of said cam.

2. The invention as defined in claim 1 wherein said rod has a stroke sufficient to move said control member to said first position in response to said signal.

3. The invention as defined in claim 2, including a first cam member supported for rotation in timed relationship to the rotation of said drive shaft; a second cam member supported for rotation in timed relation to said first cam member, said second cam member being rotatable at a dissimilar rate with respect to said first cam member; and switch means actuated by a predetermined disposition of each said cam members and operable to transmit a signal to said cylinder member upon actuation.

4. The invention as defined in claim 2 including a source of pressurized fluid; valve means for receiving said signal and operable upon receipt of said signal to introduce pressurized fluid to said cylinder to project said rod; a first cam member supported for rotation in timed relationship to the rotation of said drive shaft; first switch means engageable with said first cam member; a second cam member supported for rotation in timed relationship to said first cam member, and driven at a rate of rotation dissimilar to said first cam member; second switch means engageable with said second cam member; and said first and second switch means being connected to cooperatively transmit said signal to said valve means upon each of said cam members being disposed in a predetermined disposition.

5. A system for indexing a workpiece transfer means, comprising:
(a) a rotatable drive shaft drivingly coupled to a workpiece transfer means;
(b) a rotatable cam having a contour and arranged for coacting timed rotation with said drive shaft;
(c) a source of variable fluid power;
(d) a fluid motor connected to said source of fluid power and being operative to rotate said shaft at a rate which is proportional to the output of said source of fluid power;
(e) means for controlling the output of said source of fluid power, comprising:
(1) a movable control member connected to said source of fluid power such that the output of said source of fluid power is associated with the position of said control member;
(2) means providing a connection between the contour of said cam and said control member comprising:
(i) a movable cylinder member;
(ii) a follower member fixedly mounted on said cylinder member and operably engaged with the contour of said cam;
(iii) a rod which is projectable from said cylinder member in response to a signal; and
(iv) means providing a connection between said rod and said control member so that the control member is moved as said cam is rotated.

6. The invention as defined in claim 5, wherein said cylinder member is adapted to extend said rod in response to said signal a distance sufficient to move said control member to a terminal position terminating the fluid output of said fluid motor.

7. The invention as defined in claim 6, including a first cam member supported for rotation in timed relationship to the rotation of said drive shaft; a second cam member supported for rotation in timed relationship to the rotation of said first cam member, said second cam member being rotatable at a different rate relative to said first cam member; and switch means operable upon being actuated to transmit a signal to said cylinder member, said switch means being actuated by said first and cam members being rotated to individual predetermined dispositions.

8. The invention as defined in claim 7, including a second source of fluid power, timing means, and valve means actuated by said timing means a predetermined period after the termination of the output of said fluid motor to open a connection between said second source of fluid power and said cylinder member to move said rod member and said control away from said terminal position.

References Cited

UNITED STATES PATENTS

| | | | |
|---|---|---|---|
| 2,693,595 | 11/1954 | Belluche et al. | |
| 3,184,229 | 5/1965 | Weber | 198—110 X |
| 3,270,859 | 9/1966 | Bargel | 198—135 X |
| 1,815,555 | 7/1931 | Feige | 198—135 XR |
| 2,937,845 | 5/1960 | La Rocque et al. | 91—35 XR |

ANDRES H. NIELSEN, *Primary Examiner.*

UNITED STATES PATENT OFFICE
CERTIFICATE OF CORRECTION

Patent No. 3,437,191                                    April 8, 1969

Marcus J. Auernhammer et al.

It is certified that error appears in the above identified patent and that said Letters Patent are hereby corrected as shown below:

Column 2, line 35, "ter the" should read -- fer line --.

Signed and sealed this 30th day of December 1969.

(SEAL)
Attest:

Edward M. Fletcher, Jr.                      WILLIAM E. SCHUYLER, JR
Attesting Officer                                 Commissioner of Patents